United States Patent
Cepulis (10) Patent No.: US 7,404,178 B2
(45) Date of Patent: Jul. 22, 2008

(54) ROM-EMBEDDED DEBUGGING OF COMPUTER

(75) Inventor: Darren John Cepulis, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 744 days.

(21) Appl. No.: 10/780,967

(22) Filed: Feb. 18, 2004

(65) Prior Publication Data

US 2005/0183069 A1   Aug. 18, 2005

(51) Int. Cl.
*G06F 9/44* (2006.01)
(52) U.S. Cl. .................. 717/124; 717/128; 717/129
(58) Field of Classification Search .......... 717/124–129
See application file for complete search history.

(56) References Cited

U.S. PATENT DOCUMENTS

| | | | |
|---|---|---|---|
| 5,321,828 A | 6/1994 | Phillips et al. | |
| 5,555,783 A | 9/1996 | Pienta | |
| 5,740,351 A * | 4/1998 | Kasten | 714/35 |
| 5,881,260 A * | 3/1999 | Raje et al. | 712/210 |
| 5,926,638 A * | 7/1999 | Inoue | 717/125 |
| 5,935,006 A | 8/1999 | Nakajima | |
| 6,023,727 A | 2/2000 | Barrett et al. | |
| 6,067,614 A | 5/2000 | Goto | |
| 6,154,857 A | 11/2000 | Mann | |
| 6,167,536 A | 12/2000 | Mann | |
| 6,314,530 B1 * | 11/2001 | Mann | 714/38 |
| 6,560,722 B1 * | 5/2003 | Frankel et al. | 714/38 |
| 6,567,910 B2 * | 5/2003 | Tessarolo et al. | 712/227 |
| 6,615,371 B2 * | 9/2003 | McCullough et al. | 714/45 |
| 6,622,184 B1 * | 9/2003 | Tabe et al. | 710/36 |
| 6,651,243 B1 | 11/2003 | Berry et al. | |
| 6,658,416 B1 | 12/2003 | Hussain et al. | |
| 6,658,557 B1 | 12/2003 | McCoy et al. | |
| 6,658,651 B2 | 12/2003 | O'Brien et al. | |
| 6,662,313 B1 | 12/2003 | Swanson et al. | |
| 6,694,489 B1 * | 2/2004 | Case et al. | 716/1 |
| 6,834,360 B2 * | 12/2004 | Corti et al. | 714/37 |
| 6,954,847 B2 * | 10/2005 | Coon et al. | 712/208 |
| 7,191,445 B2 * | 3/2007 | Brokish | 718/102 |
| 7,313,729 B2 * | 12/2007 | Chuang et al. | 714/29 |
| 2002/0065646 A1 * | 5/2002 | Waldie et al. | 703/26 |
| 2003/0074650 A1 * | 4/2003 | Akgul et al. | 717/129 |
| 2005/0081196 A1 * | 4/2005 | Lee et al. | 717/168 |

OTHER PUBLICATIONS

Berger, Arnold; Barr, Michael; "On-Chip Debug", 2003, URL <http://faculty.uwb.edu/aberger/CSS427W06/Articles/bdm-primer.pdf>, retrieved from scholar.google.com Apr. 18, 2007.*

Chen, Hsin-Ming; Kao, Chung-Fu; Huang, Ing-Jer; "Analysis of Hardware and Software Approaches to Embedded In-Circuit Emulation of Microprocessors", p. 127-133, 2002, Australian Computer Society, Inc., ACM, retrieved Apr. 18, 2007.*

(Continued)

*Primary Examiner*—Wei Y. Zhen
*Assistant Examiner*—Anna Deng (57) ABSTRACT

A debugger program, embedded in a ROM of a computer, operates on instructions of a target process executed by the computer.

27 Claims, 4 Drawing Sheets

OTHER PUBLICATIONS

MacNamee, Ciaran; Hefferman, Donal; "Emerging on-chip debugging techniques for real-time embedded systems", p. 295-303, Dec. 2000, Computing & Control Engineering Journal, retrieved Apr. 18, 2007.*

Paulin, Peirre G; Karim, Faraydon; Bromley, Paul; "Network Processors: A Perspective on Market Requirements Processor Architectures and Embedded S/W Tools", p. 420-427, 2001 IEEE, retrieved Apr. 18, 2007.*

DS-750 Development Tool for 87C750 Family of Microcontrollers, Product Brochure.

"NStrace: A bus-driven instruction trace tool for PowerPC microprocessors," IBM Journal of Research and Development, Performance analysis and its impact on design; vol. 41, No. 3, 1997, http://www.research.ibm.com/journal/rd/413/sandon.html.

* cited by examiner

ROM-EMBEDDED DEBUGGING OF COMPUTER

BACKGROUND

A processor in a computer operates on instructions with no indication of what is happening internally, except for external signals on I/O pins. The contents of registers and cache within the processor may be assumed, if the processor is functioning properly, but are usually unknown, unless a specific request is made to read such information. Since the internal functions of the processor are effectively hidden, if a hardware or software error occurs during execution of a program, it is often difficult or time-consuming to determine whether the cause of the error is in the processor, in some other component of the computer or in the program instructions.

Computer program execution tracing is a useful technique for locating hardware and software errors in the performance of a computer by generating, or "capturing," a "trace" of executed program instructions. The program execution trace may also log certain events as they occur, a so-called event-based profiling technique. The program execution trace is essentially a listing of the executed instructions, called subroutines and accessed resources and sometimes the results thereof. This technique may be used, for example, in a power-on self test (POST) of the computer to discover errors in the performance of the processor, the firmware or the system board. This technique may also be used after POST to discover errors in programs or peripheral devices operating in the computer.

Some variations in program execution tracing use logic analyzers, in-target probes (ITPs) or in-circuit emulators (ICEs) to view executed instructions or to generate the program execution traces. Each of these devices has various benefits or uses. However, in addition to the cost of these devices, each also has limitations.

The logic analyzer monitors signals within the computer, such as signals on a bus, the I/O pins of a processor or another component in the computer. The logic analyzer can capture the state of the signals at any given moment and can capture a trace of the signals to record changes in the state of the signals over a period of time. The logic analyzer does not, however, control the computer or issue commands to get specific data. Thus, a significant limitation in logic analyzers is that the captured traces are dependent on the external signals of the processor, or other component, being monitored. The internal workings of the processor, such as the state of the registers or the cache, remain hidden. Thus, when the internal cache of the processor is enabled, many instructions cannot be captured. Additionally, significant manual translation and filtering must be done to correlate the captured signal data to actual instructions executed.

An ITP or an ICE enables debugging of the computer, the processor or the program during hardware/software development not only by monitoring the I/O pins or bus signals, but also by controlling the processor, bus or other component to which it is connected. Thus, not only does the ITP or ICE intercede between the desired component (e.g. the processor) and circuit board to intercept and/or sense some or all of the signals from the component, but the ITP or ICE can also issue commands to the component. For example, the ITP or ICE can request data from the registers of the processor in addition to displaying a current state of the signals on the I/O pins. The ITP or ICE cannot, however, access the cache, and the less expensive ITPs or ICEs cannot capture a trace of the executed instructions. The ITP or ICE can be used to manually step through each instruction, but this process is very slow. Additionally, some ICEs have some trace capture ability that only runs off a particular bus that the ICE is monitoring, so the ICE captures only the bus activity.

Each of these devices (the logic analyzers, ITPs and ICEs) is used within a laboratory setting. In other words, they are used to debug computers, computer components and programs under development by a manufacturer or that have reported errors in the field and have been returned by a consumer. Due to the cost and size of the logic analyzers, ITPs and ICEs, these devices are almost never taken out of the laboratory setting to analyze a computer, component or program in the field.

In order to view the contents of the cache and other internal workings of the processor, special "bond-out" versions of integrated circuit chips have been produced. The bond-out chips resemble the standard versions of their integrated circuits, but have special pins, and sometimes complete buses, that make "internal" signals available at special external bond-out interfaces. The bond-out features, however, take up valuable space in, and can affect the operation of, the integrated circuit. Additionally, special devices and programs are needed to decode and give meaning to the signals provided at the special bond-out interfaces.

Another technique for monitoring internal functions of the processor involves an "on-chip trace cache" and supporting circuitry within the integrated circuit of the processor. Trace information is captured in the on-chip trace cache during operation of the processor. Afterwards, the captured information can be downloaded and analyzed. This technique, however, takes up valuable space within the integrated circuit.

Another technique to analyze the performance of a target computer, but which does not necessarily incorporate additional devices (e.g. the logic analyzers, ITPs and ICEs) or additional on-chip circuitry, is "instrumented source code." In this technique, executable "tag statements" are inserted into various branches and locations of source code, thereby "instrumenting" the source code. After the source code has been compiled and linked, the tag statements are executed along with the rest of the code. As each tag statement is executed, it performs an operation that can be either detected by an analysis device or recorded within the target computer for later examination. For example, each tag statement may write a value to different addresses so that the contents of the addresses provide an indication of which tag statements were executed and in what order. The general flow of the software is thus indicated by the contents of the addresses.

SUMMARY

According to a particular embodiment of the present invention, a method for debugging a computer system comprises initiating a process in the computer system, the process including instructions; launching a debugger program that is embedded in a ROM of the computer system; executing at least part of the instructions; and the debugger program operating on at least part of the executed instructions.

According to another embodiment of the present invention, a computer system comprises a processor; a read-only memory (ROM) connected to the processor; a target process having instructions capable of being executed by the processor; and a debugger program embedded within the ROM and capable of being executed by the processor to operate on at least part of the instructions of the target process.

DETAILED DESCRIPTION

Figure 1:
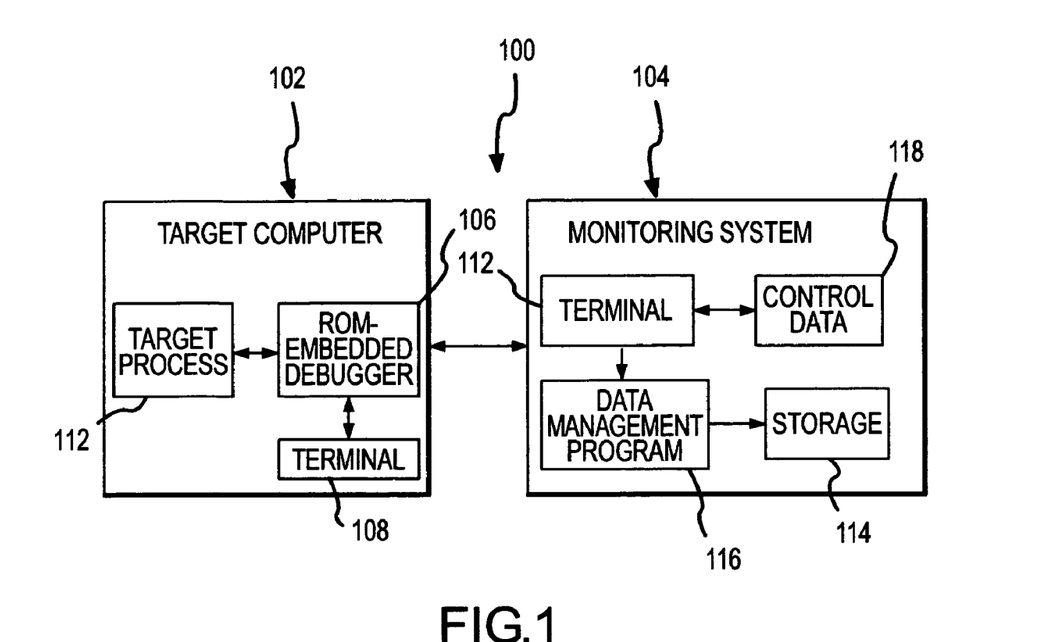
FIG. 1 is a block diagram of a computer debugging system according to an embodiment of the present invention.

A computer debugging system 100 incorporating an embodiment of the present invention is shown in FIG. 1. The computer debugging system 100 generally includes a target computer 102 and a monitoring system 104. The target computer 102 is preferably a general-purpose X86 processor-based computer system, or any other appropriate computer system, for which hardware and/or software is being developed and/or debugged. The monitoring system 104 is also preferably an appropriate general-purpose computer system.

The target computer 102 includes a ROM-embedded debugger program 106 for debugging the hardware and/or software, such as a target process 108 and any hardware with which the target process 108 may operate. The debugger program 106 is ROM-embedded, so the debugger program 106 can be launched at an appropriate point during a "boot," or power-on self-test (POST), process as well as at any other desired time. Thus, the target process 108 may be the boot process as well as any other process running in the target computer 102. In other words, the debugger program 106 can be used to debug any portion of the boot process following the launch of the debugger program 106 as well as any other process launched after completion of the boot process. In a particular embodiment, the boot process preferably performs only a minimum portion thereof to enable the debugger program 106 to function before the debugger program 106 is launched, so that as much of the boot process as possible can be subjected to the debugger program 106. Additionally, the target computer 102 also preferably includes a terminal 110 (such as, but not limited to, a VT100 terminal) for communicating with the monitoring system 104. In this manner, any data generated by the debugger program 106 can be quickly transferred to the monitoring system 104, instead of using resources within the target computer 102 to save and manage the data. Additionally, if stored in the target computer 102, the data could be lost upon a crash of the target computer 102.

The monitoring system 104 preferably includes at least sufficient hardware and/or software to assist the debugger program 106. Such hardware and software preferably includes a terminal 112, a storage device 114, a data management program 116 and optional data for controlling (control data 118) the debugger program 106. The terminal 112 (such as, but not limited to, a VT100 terminal) communicates with the target computer 102 to receive the data generated by the debugger program 106. The data management program 116 reads the data coming in through the terminal 112 and stores the data in the storage device 114. The control data 118 preferably includes files and data, such as previously prepared scripts, which may be transferred through the terminal 112 to the target computer 102 to assist the debugger program 106. Thus, a user may prepare a script of a series of commands within the control data 118 for the debugger program 106 to download and perform.

In operation, the user preferably connects the target computer 102 and the monitoring system 104, sets up the monitoring system 104 (e.g. by launching the data management program 116), creates any desired control data 118 and then launches the debugger program 106. The debugger program 106 is preferably launched during execution of the target process 108 or by the target process 108 or before launching the target process 108. For example, if the target process 108 is the boot process, then the debugger program 106 is preferably launched during the boot process and by the boot process. Once the target process 108 and the debugger program 106 are running, the user preferably issues commands to the debugger program 106 to operate on instructions of the target process 108, to display at least some of the data to the user and to send the data to the monitoring system 104. Exemplary commands and operations are described below. The user also preferably operates the monitoring system 104 to view, analyze, manipulate and search the data as needed.

Figure 2:
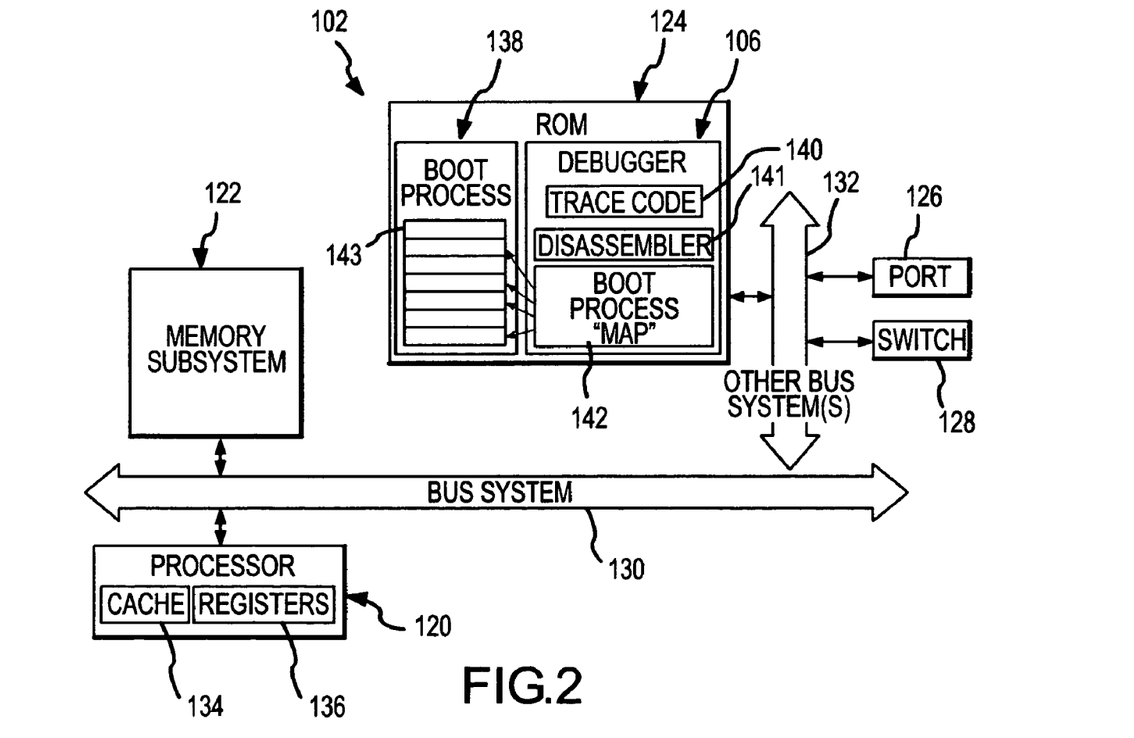
FIG. 2 is a block diagram of a target computer system according to an embodiment of the present invention and incorporated in the computer debugging system shown in FIG. 1.

According to an embodiment as shown in FIG. 2, the target computer 102 generally includes, among other components, one or more processors 120, a memory subsystem 122, a ROM 124, a port 126 and a switch 128 connected together by one or more bus systems 130 and 132. For example, according to a more particular embodiment, the target computer 102 shown may be an X86-compatible-processor-based personal computer or server, such as a computer with an Intel Pentium™ processor. The processor 120 executes software using a variety of internal components including a cache memory 134 and a set of registers 136, among other components. The memory subsystem 122 provides a main computer memory to support the processor 120. The ROM 124 generally stores the boot process 138 and the debugger program 106. The debugger program 106 generally includes, among other functions, embedded trace code 140 and an embedded disassembler 141. The port 126, such as a serial port, provides a physical connection point for the connection to the monitoring system 104. The switch 128, such as a dip switch on a motherboard in the target computer 102, physically enables and disables the debugger program 106.

According to a particular embodiment, the boot process 138 preferably launches the debugger program 106 whenever the boot process 138 determines that the switch 128 is set to enable the debugger program 106, but does not launch the debugger program 106 when the switch is not set to enable the debugger program 106. In this manner, the user can select whether to use the debugger program 106 before the user boots or turns on the target computer 102. If selected, then the debugger program 106 will be launched during and by the boot process 138 after the boot process 138 reads the state of the switch 128. The boot process 138 will then halt, and the user will preferably be presented with a command prompt. The user can then enter commands (described below) to control the operations of the debugger program 106.

According to another particular embodiment, the switch 128 may enable the debugger program 106 after the target computer 102 has booted and is ready to run other programs as the target process 108 (FIG. 1). Thus, the switch may be set at any time in order to debug any target process 108.

Additionally, the debugger program 106 may be used not only in a laboratory setting or during initial development of the target computer 102, but also in the field to debug a problem encountered any time after the target computer 102 has been developed and a production version has been provided to a customer. To effectively hide the debugger program 106 from the customer, however, the switch 128 may be set to disable the debugger program 106 in the production version of the target computer 102. Additionally, if the monitoring system 104 is a notebook computer, then it is not so inconvenient or costly to take it into the field as it would be to take an ITP, ICE or logic analyzer. Instead, a service call to run the debugger program 106 at the customer's site can be practical to respond to a problem in the production version reported by the customer. A service technician at the customer's site can then set the switch 128 in the production version of the target computer 102 to enable the debugger program 106, connect the production version of the target computer 102 to the (notebook computer) monitoring system 104, and proceed to debug the problem in the production version of the target computer 102.

In the case of the boot process 138 being the target process 108, the debugger program 106 preferably has an embedded "map" 142 of the boot process 138. The boot process map 142 preferably includes at least some labels and addresses specifying locations of parts 143 of the boot process 138. The boot process map 142 enables the debugger program 106 to disassemble specific portions of the boot process 138 and to set break points at specific points within the boot process 138 without the user knowing the actual addresses of the portions of and points within the boot process 138.

The commands that are available for the user to enter at the command prompt of the debugger program 106 preferably include, but are not limited to, the following exemplary commands. For example, one command (a continual-trace command) preferably causes each instruction of the target process 108 to be executed followed by an interruption. Each interruption allows the debugger program 106 to disassemble (with the embedded disassembler 141) and capture a trace (with the embedded trace code 140) of the current instruction. The captured trace preferably includes the disassembled instruction, which is transferred to the monitoring system 104 for storage. Every instruction that is executed, therefore, can be captured, even if the processor 120 is operating on instructions stored in the cache memory 134.

In a particular embodiment involving a target computer 102 having an X86-compatible processor, the interruption of the target process 108, for example, is caused by interrupt 3 (INT3) break points. The trace code 140 preferably sets each INT3 break point at the start of the next instruction immediately following the current instruction before the current instruction is executed. The disassembly of the current instruction identifies the current instruction and its length (e.g. in bytes, words, dwords, etc. of opcode and operands), which enables the trace code 140 to determine the starting point of the next instruction. The identification of the current instruction also enables the trace code 140 to determine whether there is more than one possible next instruction, e.g. for a current instruction that is a conditional jump. In this case, INT3 break points are set at the start of every possible next instruction.

Each INT3 break point is set, for example, by copying the first byte of each next instruction to a secure memory location and then writing an INT3 opcode in place of the first byte. The debugger program 106 then sets a "trace flag" to indicate that the continual trace is being performed and then jumps to the target process 108 to allow execution of the current instruction. After execution of the current instruction, the INT3 break point is encountered at the start of the next instruction, which causes execution of an INT3 handler. Thus, at the initial launch of the debugger program 106, the debugger program 106 preferably "hooks" the INT3 handler, so the INT3 handler will transfer execution back to the debugger program 106. Upon returning to the debugger program 106 through the INT3 handler, the previous next instruction is now a new current instruction. The debugger program 106 restores the first byte of the new current instruction (and any other previously possible next instruction). The debugger program 106 proceeds, as above, with disassembling and capturing a trace of the new current instruction. If the trace flag is set, indicating that the continual trace is being performed, then another INT3 break point is set at the start of a new next instruction and the new current instruction is executed as above.

Another command may perform most, if not all, of the functions of the continual-trace command, but also transfer a copy of the contents of the registers 136 along with the captured trace of the disassembled instruction to the monitoring system 104 for storage. In either case, the debugger program 106 continues to capture a trace of the execution of the target process 108 until the target process 108 terminates normally or the debugger program 106 encounters a "hard" break point or until the target computer 102 "hangs," or "crashes." Another command, therefore, preferably allows the user to set one or more hard break points at one or more desired addresses (e.g. a specified segment and offset) within the target process 108. The hard break points stop the execution and trace capture of the target process 108 at a desired point and return control of the target computer 102 to the command prompt of the debugger program 106. Additionally, other commands preferably clear one or more of the hard break points and/or store the hard break points for later or repeated usage.

In case the target computer 102 hangs during a trace capture, the last executed instruction of the target process 108 (presumably the instruction that caused the hang) is the last stored instruction in the storage 114 of the monitoring system 104. The user can, thus, view the last instruction of the captured trace and possibly determine the cause of the hang.

Another command preferably starts the continual-trace, described above, but without capturing a trace of subroutines and/or functions called by a higher-level routine. In this manner, valuable processing time is not taken up with capturing a trace of subroutines and/or functions that are known to be good. Instead, a trace is quickly captured of only the higher-level routine. This trace capture provides a simplified view of the execution of the target process 108.

Another command preferably causes a trace capture and execution of one instruction of the target process 108 at a time, so the user can carefully single-step through the execution of the target process 108 to try to locate a source of an error. For the X86-compatible-processor-based target computer 102, the single-step trace command preferably uses, for example, an interrupt 1 (INT1) function by setting an INT1 flag. When the INT1 flag is set, program execution is interrupted after the current instruction even though a break point has not been set at the start of the next instruction. Program execution then passes to an INT1 handler, which returns control to the command prompt of the debugger program 106. Thus, the debugger program 106 preferably "hooks" the INT1 handler, as well as the INT3 handler. The single-step trace command, therefore, causes the debugger program 106 to set the INT1 flag before executing the current instruction. Upon returning through the INT1 handler, the debugger program 106 removes the INT1 flag. Another command may start the single-step trace, as above, but at a specified address.

Another command preferably causes the current instruction to be executed without a trace being captured. In this manner, the user can skip capturing a trace of instructions in which the user is not interested.

Another command preferably causes the target process 108 to be executed without any interruption until the target process 108 terminates. Another command preferably causes the uninterrupted execution of the target process 108 to start at a specified address or instruction. Another command preferably allows the uninterrupted execution only up to a specified break point, at which the continual-trace begins or control is returned to the command prompt of the debugger program 106. Thus, the user can skip tracing some portions of the target process 108 altogether.

Another command preferably causes the contents of the registers 136 to be displayed to the user and/or transferred to the monitoring system 104 for storage. Another command preferably causes data (in a byte, word, dword, etc.) at a default or specified address within the memory subsystem 122 or the cache memory 134 to be displayed to the user and/or transferred to the monitoring system 104 for storage. Another command preferably causes one of the registers 136 to be set to a specified desired value. Another command preferably causes a flag within the processor 120 to be set or unset as desired. Another command preferably causes a specified address (in byte, word, dword, etc.) within the memory subsystem 122 or the cache memory 134 to be set to a specified desired value. Other commands preferably cause data (in byte, word, dword, etc.) to be read from or written to a specified port in the target computer 102. Another command preferably causes bus registers (of one of the bus systems 130 or 132) to be displayed to the user and/or transferred to the monitoring system 104 for storage. Another command preferably causes SPD (serial presence detect) data of a memory module within the memory subsystem 122 to be displayed to the user and/or transferred to the monitoring system 104 for storage.

Another command preferably causes an instruction at a default or specified address within the target process 108 to be disassembled, so the user can view other instructions that are not the current instruction. Another command preferably causes an unassembled instruction to be assembled and stored at a default or specified address within the target process 108, so the user can try a different instruction to see if the different instruction cures an error.

Another command preferably causes a script of commands to be downloaded from the control data 118 (FIG. 1) in the monitoring system 104 to the target computer 102 and executed. Another command preferably causes the debugger program 106 to terminate.

The above set of commands is exemplary only. An actual set of commands may depend on anticipated debugging situations and may include some or all of the above-described commands, one or more different commands not described herein and/or one or more modified versions and/or combinations of the above-described commands.

Figure 3:
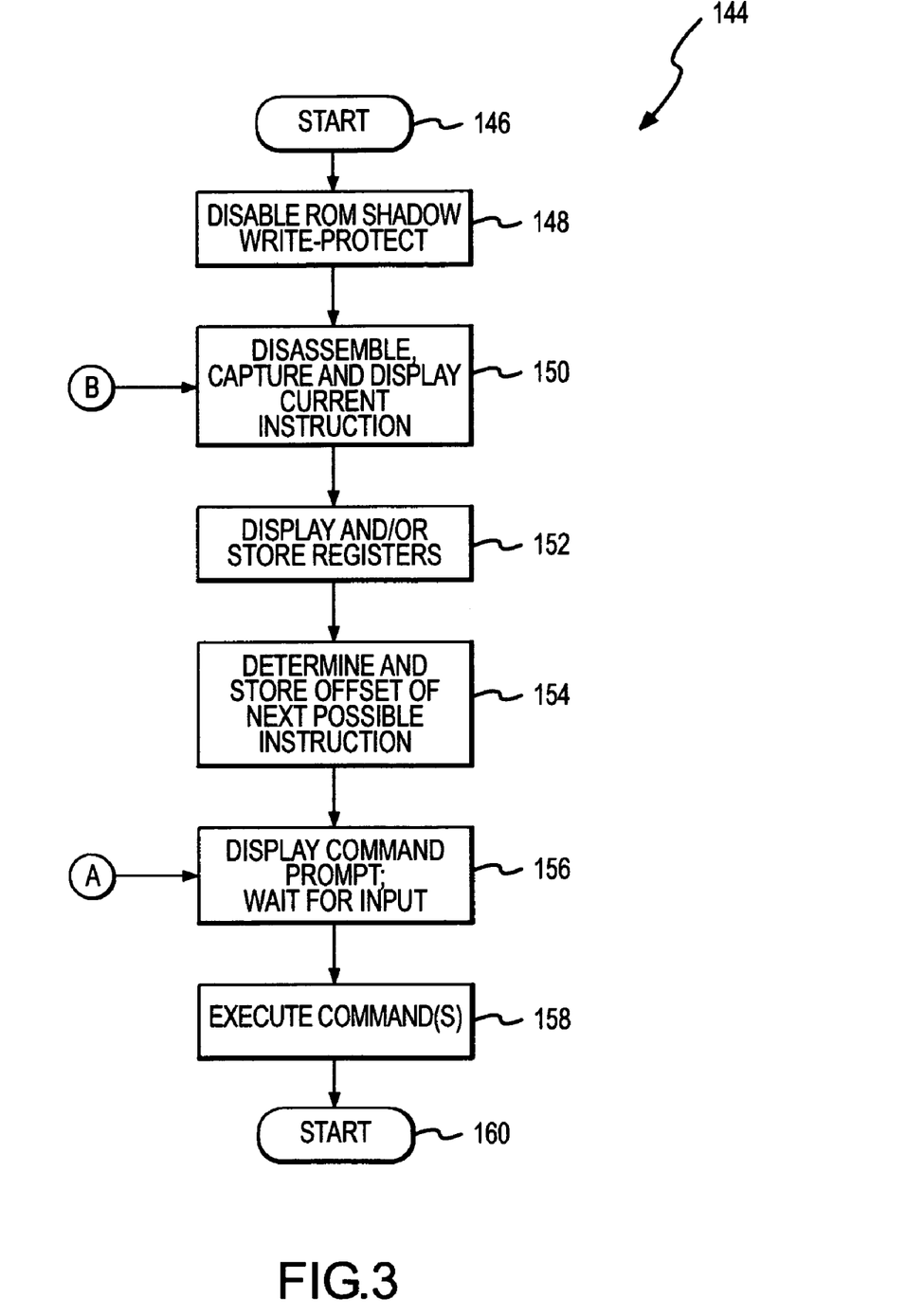
FIG. 3 is a simplified flow chart of a generalized procedure according to an embodiment of the present invention for debugging a process in the target computer system shown in FIG. 2.

A simplified exemplary procedure 144 for the debugger program 106 to operate on the boot process 138 as the target process 108 in the target computer 102 is shown in FIG. 3. The procedure 144 may be combined with other procedures and have other features whether or not described herein. At some point prior to launching the debugger program 106, the boot process 138 may have copied the contents of the ROM 124 to the memory subsystem 122, so the boot process 138 and any other processes provided in the ROM 124 can operate more quickly from the memory subsystem 122. The copy of the ROM contents is known as a "ROM shadow," which is usually then write-protected to prevent corruption thereof. However, the debugger program 106 may have to write break points into the boot process 138 in order to capture a trace of the execution of the boot process 138 or in order to interrupt execution of the boot process 138 to examine or modify the contents of the registers 136 or of the memory subsystem 122. Therefore, upon the procedure 144 starting (at 146), the write-protection on the ROM shadow is disabled at 148. The current instruction of the boot process 138, before which the boot process 138 launched the debugger program 106, is disassembled at 150. A trace of the disassembled current instruction is also preferably captured and displayed for the user at 150. The trace capturing may also include transferring the current instruction to the monitoring system 104 for storage. The contents of the registers 136 are optionally displayed and/or transferred to the monitoring system 104 for storage (at 152) as well. From the disassembled current instruction, the offset of the next possible instruction is determined and stored (at 154) in case a break point will be set later, e.g. following a continual trace command entered by the user.

The command prompt is displayed (at 156) to the user and the procedure 144 waits for input by the user of a command, such as, but not limited to, the commands described above. Once the user enters one or more commands (at 156), the command is executed at 158. If the command is to end the debugger program 106, then the procedure 144 ends at 160. If the command does not end the debugger program 106, then after executing the command, the procedure 144 returns through A or B to 150 or 156, respectively, depending on whether the current instruction needs to be disassembled, captured and displayed at 150 (followed by 152 and 154, as above) before displaying the command prompt and waiting for the user to input another command at 156.

Figure 4:
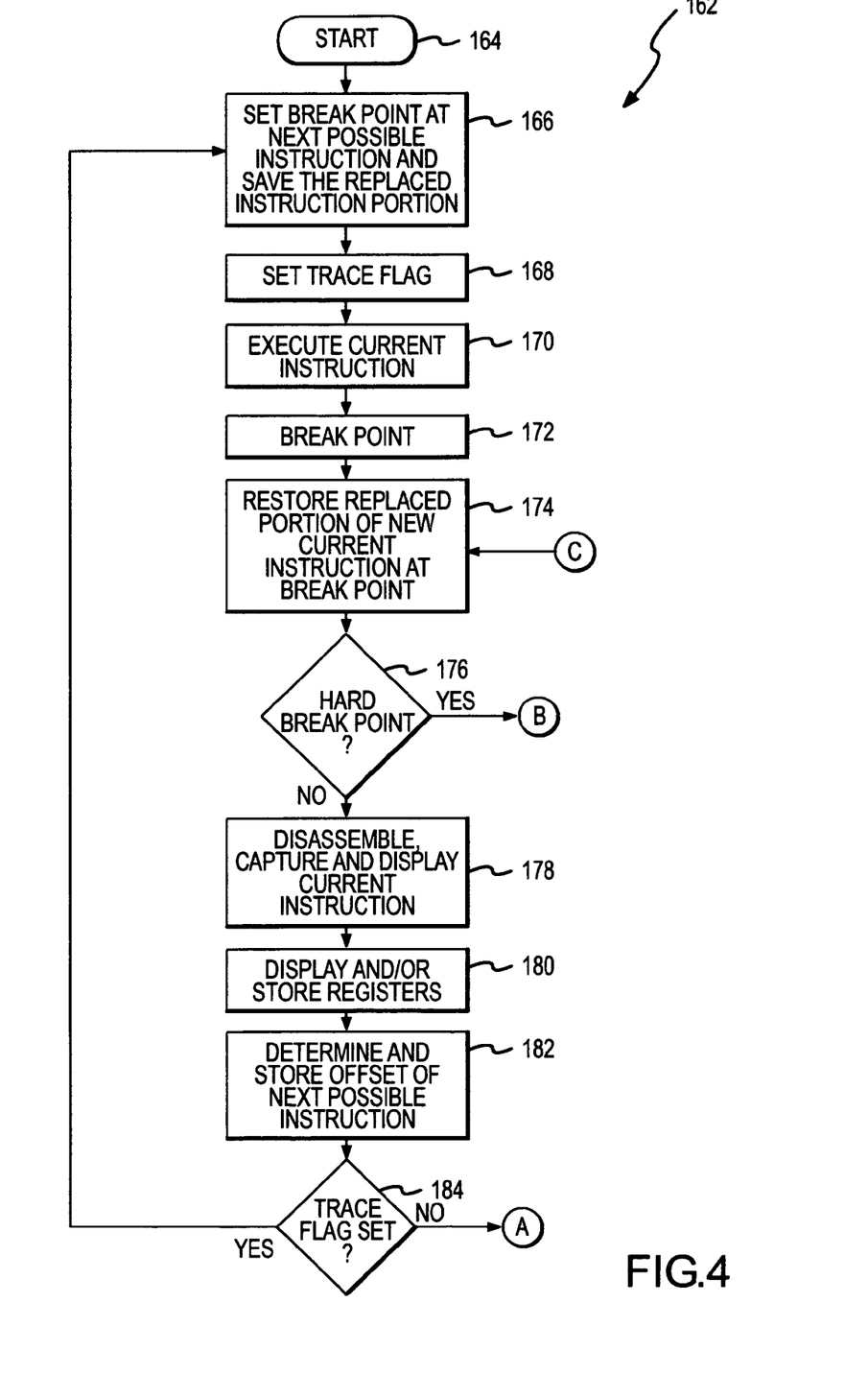
FIG. 4 is a simplified flow chart of a generalized procedure according to an embodiment of the present invention for capturing a continual trace of at least a portion of a process in the target computer system shown in FIG. 2.

If the command executed at 158 is for a continual trace, then the debugger program 106 jumps to a simplified exemplary procedure 162 for performing a continual trace as shown in FIG. 4. The procedure 162 may be combined with other procedures and have other features whether or not described herein. Upon starting (at 164), a break point is set (at 166) at the start of the next possible instruction, preferably as described above, according to the offset that was determined and stored at 154. Additionally, since (according to a particular embodiment) the setting of the break point replaces the first byte of the next possible instruction, the replaced portion of the next possible instruction is saved (at 166) to a secure memory location. The trace flag is set at 168. Control then jumps to the current instruction of the target process 108 to allow execution of the current instruction at 170. After execution of the current instruction, the break point (set at 166) is encountered at 172 at the start of the next instruction, which is now a new current instruction. According to a particular embodiment, the break point causes a call to the INT3 handler, which returns control to the debugger program 106. Control jumps to 174, at which the portion of the next instruction (now the new current instruction) that had been replaced by setting the break point at 166 is restored.

If at 156 the user had set a hard break point after the instruction that was just executed at 170 (as determined at 176), then control returns through B to 150 to disassemble, capture and display the new current instruction (followed by 152 and 154, as above) before displaying the command prompt and waiting for the user to input another command at 156. Otherwise, if there is no hard break point as determined at 176, then the new current instruction is disassembled, captured and displayed (at 178). The contents of the registers 136 are optionally displayed and/or transferred to the monitoring system 104 for storage (at 180) as well. From the disassembled new current instruction, the offset of a new next possible instruction is determined and stored (at 182). If the trace flag is set, as determined (at 184), indicating that the continual trace is being performed, then control returns to 166 to set the next break point as determined from the offset stored at 182. Otherwise, control returns through A to 156 to display the command prompt and wait for the user to input another command. The continual trace continues repeatedly through 166-184 until a hard break point is encountered (at 176) or the target process 108 terminates or crashes.

Figure 5:
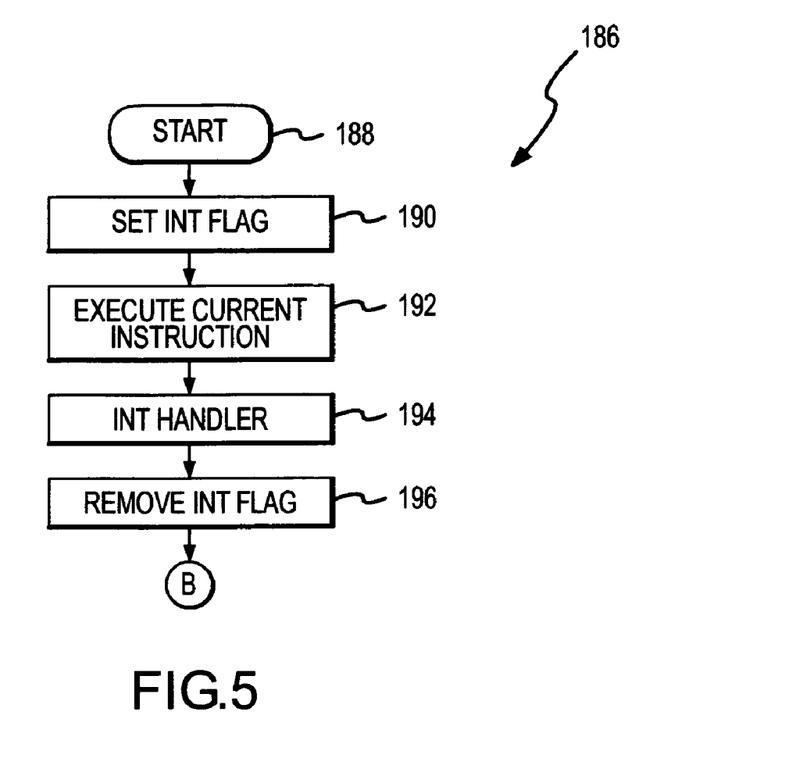
FIG. 5 is a simplified flow chart of a generalized procedure according to an embodiment of the present invention for capturing a single-step trace of at least a portion of a process in the target computer system shown in FIG. 2.

If the command executed at 158 is for a single-step trace command, then the debugger program 106 jumps to a simplified exemplary procedure 186 for performing a single-step trace as shown in FIG. 5. The procedure 186 may be combined with other procedures and have other features whether or not described herein. According to a particular embodiment, upon starting (at 188), the INT1 flag is set at 190. Control then jumps to the target process 108 to execute the current instruction at 192. After the execution of the current instruction, the INT1 flag causes an interrupt, which transfers (at 194) control to the INT1 handler, which transfers control back to the procedure 186. The INT1 flag is then removed (at 196), so control will not keep returning to the INT1 handler. Instead, control returns through B to 150 to disassemble, capture and display the next instruction as the new current instruction (followed by 152 and 154, as above) before displaying the command prompt and waiting for the user to input another command at 156. If the user continues to input the single-step trace command at 156, then the procedure 186 will repeat by tracing and executing one step at a time.

Figure 6:
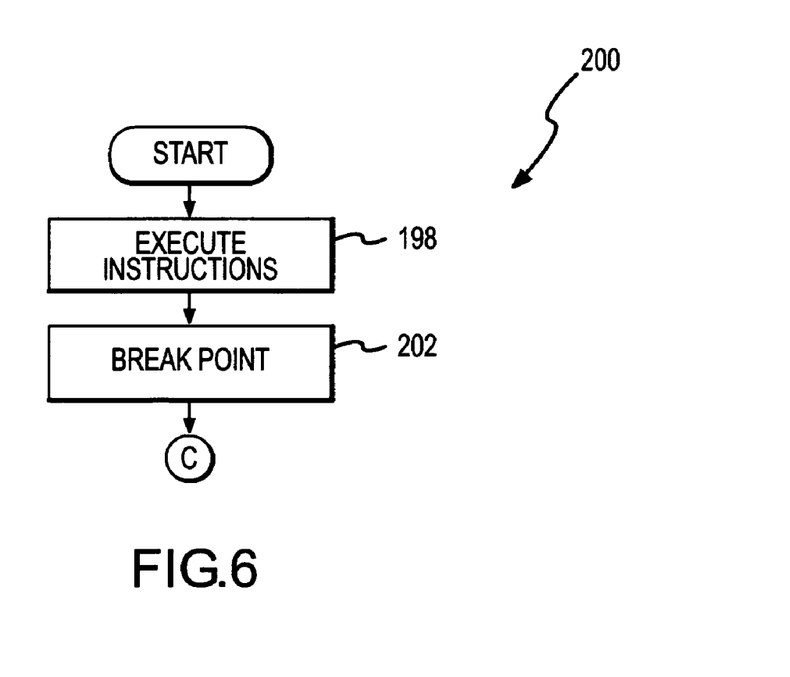
FIG. 6 is a simplified flow chart of a generalized procedure according to an embodiment of the present invention for executing at least a portion of a process in the target computer system shown in FIG. 2 without capturing a trace of the executed portion.

If the command executed at 158 is to execute a desired portion of the target process 108 without a trace capture, then control jumps (at 198) to execute the instructions at the desired portion of the target process 108 as illustrated by a simplified exemplary procedure 200 shown in FIG. 6. The execution of the desired portion of the target process 108 may continue until the target process 108 terminates or crashes. However, if the user also set at 156 a hard break point to return control to the debugger program 106 after the desired portion of the target process 108 has been executed, then the hard break point is encountered at 202. The setting (at 156) of the hard break point preferably replaced the first byte of the next instruction following the desired portion of the target process 108 with an INT3 opcode. Therefore, control passes to the INT3 handler, which returns control through C to 174 of procedure 162 in FIG. 4. Therefore, the first byte of the next instruction is restored at 174. At 176, the hard break point is encountered, so the code branches through B to 150 in procedure 144 (FIG. 3) to disassemble, capture and display the next instruction as the new current instruction (followed by 152 and 154, as above) before displaying the command prompt and waiting for the user to input another command at 156.

I claim:

1. A method for debugging a computer system, comprising:

initiating a process in the computer system, the process including instructions and running on a general-purpose processor in the computer system;

launching a debugger program that is embedded in a ROM of the computer system, the debugger program running on the general-purpose processor;

executing at least part of the instructions by the general-purpose processor;

interrupting execution of the instructions by stopping the execution of the instructions at a first break point in order for the debugger program to operate on at least part of the executed instructions;

the debugger program disassembling a current instruction of the instructions;

determining a length of the current instruction, the length of the current instruction indicating a start point for a next instruction of the instructions;

the debugger program setting a second break point in the instructions at the start point of the next instruction; and continuing the execution of the instructions.

2. A method as defined in claim 1, further comprising:
   the debugger program capturing a trace of the at least part of the executed instructions.

3. A method as defined in claim 2 wherein:
   the computer system includes a port connected to a monitoring system;
   and further comprising:
   outputting the captured trace through the port to the monitoring system.

4. A method as defined in claim 1, wherein:
   the process comprises a boot process;
   the instructions comprise boot instructions stored in the ROM of the computer system; and
   the debugger program is launched from within the boot process.

5. A method as defined in claim 1, further comprising:
   interrupting the execution of the instructions at a current instruction;
   the debugger program operating on the current instruction by disassembling the current instruction; and
   executing the current instruction.

6. A method as defined in claim 5, further comprising:
   before executing the current instruction, determining a location of a next instruction of the instructions; and
   after executing the current instruction, interrupting the execution of the instructions at the next instruction.

7. A method as defined in claim 1, further comprising:
   setting a switch within the computer system; and
   launching the debugger program in response to detecting the set switch.

8. A method as defined in claim 1, further comprising:
   setting a break point within the process according to a location specified in a map of the process contained in the debugger program.

9. A computer system, comprising:
   at least one general-purpose processor;
   a read-only memory (ROM) connected to the general-purpose processor;
   a target process having instructions, executable by the general-purpose processor; and
   a debugger program embedded within the ROM, executable by the general-purpose processor, to interrupt execution of the instructions by stopping the execution of the instructions at a first break point in order for the debugger program to operate on at least part of the instructions of the target process;
   and wherein:
   the debugger program disassembles a current instruction of the instructions; determines a length of the current instruction, the length of the current instruction indicating a start point for a next instruction of the instructions; sets a second break point in the instructions at the start point of the next instruction; and the execution of the instructions continues.

10. A computer system as defined in claim 9, wherein:
the target process comprises a boot process.

11. A computer system as defined in claim 9, wherein:
the debugger program operates on the at least part of the instructions by capturing a trace of the execution of the at least part of the instructions.

12. A computer system as defined in claim 9, further comprising:
a switch that when set enables launching of the debugger program;
and wherein the target process launches the debugger program upon detecting that the switch is set.

13. A computer system as defined in claim 9, further comprising:
an interrupt flag that when set causes an interruption of execution of the target process;
and wherein, upon interruption of the execution of the target process, the debugger program operates on the current instruction of the target process.

14. A computer system as defined in claim 9, further comprising:
a map of the target process embedded in the debugger program and specifying locations of parts of the target process.

15. A computer debugging system, comprising:
a target computer;
a monitoring system connected to the target computer;
a data storage device in the monitoring system;
a read-only memory (ROM) in the target computer;
a general-purpose processor in the target computer;
a target process having instructions executable by the general-purpose processor in the target computer; and
a debugger program embedded in the ROM and executable by the general-purpose processor in the target computer to interrupt execution of the instructions by stopping the execution of the instructions at a first break point in order to generate data on the execution of at least part of the instructions of the target process and to transfer the data to the monitoring system for recording in the data storage device;
and wherein:
the debugger program disassembles a current instruction of the instructions; determines a length of the current instruction, the length of the current instruction indicating a start point for a next instruction of the instructions; sets a second break point in the instructions at the start point of the next instruction; and
the execution of the instructions continues.

16. A computer debugging system as defined in claim 15, wherein:
the data on the execution of the at least part of the instructions of the target process comprises a trace capture of the at least part of the instructions.

17. A computer system, comprising:
a read-only memory (ROM) means for storing computer control instructions;
a general-purpose means for executing a target process;
a ROM-embedded means for interrupting the execution of the target process at a current instruction by stopping the execution of the instructions at a first break point, the interrupting means being executable by the target process executing means;

a ROM-embedded means for disassembling the current instruction, determining a length of the current instruction, the length of the current instruction indicating a start point for a next instruction of the instructions, and setting a second break point in the instructions at the start point of the next instruction, the disassembling means being executable by the target process executing means;
a means for executing the current instruction; and
a ROM-embedded means for capturing a trace of the current instruction and of results of the execution of the current instruction, the trace capturing means being executable by the target process executing means.

18. A computer system as defined in claim 17, further comprising:
a means for transferring the captured trace to an external means for storing the captured trace.

19. A computer system comprising:
a general-purpose processor;
a read-only memory (ROM);
a target process having executable instructions that are executable by the general-purpose processor; and
a debugger program embedded within the ROM and having a disassembler and a trace capturer that are executable by the general-purpose processor;
and wherein:
the debugger program interrupts execution of the target process at some of the instructions, by stopping the execution of the instructions at a first break point;
the disassembler disassembles at least some of the instructions at which the execution of the target process is interrupted;
the debugger program determines a length of the current instruction, the length of the current instruction indicating a start point for a next instruction of the instruction, and sets a second break point in the instructions at the start point of the next instruction;
the trace capturer captures a trace of at least some of the disassembled instructions; and
the execution of the instructions continues.

20. A computer system as defined in claim 19, wherein:
the target process comprises a boot process stored within the ROM and having instructions that boot the computer system when the boot process executes.

21. A computer system as defined in claim 19, further comprising:
a port that can be connected to a monitoring system;
and wherein the debugger program outputs the captured trace through the port to the monitoring system.

22. A computer system as defined in claim 19, wherein:
the computer system executes the current instruction, encounters the break point at the next instruction, and jumps to the debugger program with the next instruction as a new current instruction.

23. A computer system comprising:
a switch;
a general-purpose processor;
a target process having executable instructions that are executable by the general purpose processor; and
a debugger program that is executable by the general-purpose processor;
and wherein:
when the switch is off, the debugger program cannot be launched in the general-purpose processor;
when the switch is on, the debugger program can be launched in the general-purpose processor to interrupt execution of the target process in the general-purpose processor at some of the instructions by stopping the execution of the instructions at a first break point and to operate on at least some of the instructions at which the execution of the target process is interrupted by disassembling a current instruction of the instructions; determining a length of the current instruction, the length of the current instruction indicating a start point for a next instruction of the instructions; and setting a second break point in the instructions at the start point of the next instruction; and the execution of the instructions continues.

24. A method for debugging a target process executing on a computer system, comprising:

launching, in a general-purpose processor of the computer system, a debugger program from a read-only memory (ROM) of the computer system, the ROM having a boot process and the debugger program embedded therein, the debugger program having a disassembler and a trace capturer;

interrupting execution, in the general-purpose processor, of the target process at a current instruction by stopping the execution of the instructions at a first break point;

the disassembler disassembling, in the general-purpose processor, the current instruction;

determining a length of the current instruction, the length of the current instruction indicating a start point for a next instruction of the instructions;

the debugger program setting a second break point in the instructions at the start point of the next instruction;

continuing the execution of the instructions; and the trace capturer capturing a trace, in the general-purpose processor, of the current instruction.

25. A method as defined in claim 24, further comprising:
executing the instruction; and
interrupting the execution of the target process after the instruction.

26. A method as defined in claim 24, wherein:
the target process comprises the boot process.

27. A method for debugging a target process executing on a computer system, comprising:

setting a switch within the computer system to one of an on state and an off state;

when the switch is set to the off state, preventing execution of a debugger program in a general-purpose processor of the computer system; and when the switch is set to the on state:

launching the debugger program in the general-purpose processor;

interrupting, in the general-purpose processor, execution of the target process at a current instruction by stopping the execution of the instructions at a first break point; and the debugger program operating, in the general-purpose processor, on the current instruction by disassembling a current instruction of the instructions; determining a length of the current instruction, the length of the current instruction indicating a start point for a next instruction of the instructions; and setting a second break point in the instructions at the start point of the next instruction; and continuing the execution of the instructions.

* * * * *

UNITED STATES PATENT AND TRADEMARK OFFICE
CERTIFICATE OF CORRECTION

PATENT NO. : 7,404,178 B2
APPLICATION NO. : 10/780967
DATED : July 22, 2008
INVENTOR(S) : Darren John Cepulis Page 1 of 1

It is certified that error appears in the above-identified patent and that said Letters Patent is hereby corrected as shown below:

In column 12, line 40, in Claim 20, delete "wherein;" and insert -- wherein: --, therefor.

In column 12, line 58, in Claim 23, delete "general purpose" and insert -- general-purpose --, therefor.

Signed and Sealed this

Twenty-seventh Day of January, 2009

JOHN DOLL
*Acting Director of the United States Patent and Trademark Office*